Patented Aug. 25, 1925.

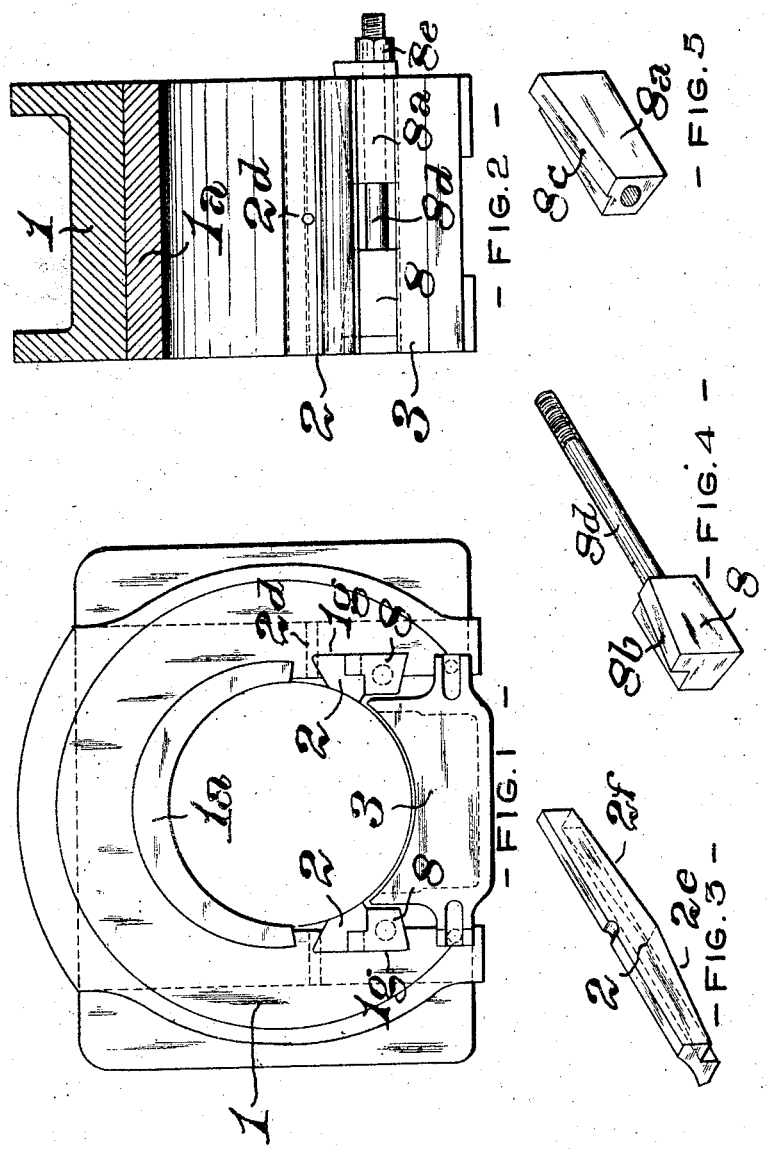

1,551,496

UNITED STATES PATENT OFFICE.

JAMES G. BLUNT, OF SCHENECTADY, NEW YORK.

LOCOMOTIVE DRIVING BOX.

Application filed February 23, 1924. Serial No. 694,741.

*To all whom it may concern:*

Be it known that I, JAMES G. BLUNT, a citizen of the United States, residing at Schenectady, in the county of Schenectady and State of New York, have invented a certain new and useful Improvement in Locomotive Driving Boxes, of which improvement the following is a specification.

My invention more particularly relates to locomotive driving boxes of the general class or type in which an increase of journal bearing surface is attained by the application of supplemental bearings, fitted in the driving box below the crown brass thereof, and is an improvement upon those set forth in Letters Patent of the United States No. 1,485,952, granted and issued to me under date of March 4, 1924.

The object of my present invention is to provide a lubricant cellar, of improved construction, which will be readily insertable in, and removable from, a locomotive driving box, and which, when in operative position, will, in addition to acting as a lubricant container, perform the function of a strut or expander to overcome the tendency of the driving box to close in on the journal. Further objects of my invention are to provide improved means for the connection and adjustment of a lubricant cellar of such type, and an improved construction of supplemental bearings, fitted below the crown brass, and of their adjusting appliances.

The improvement claimed is hereinafter fully set forth.

In the development of three cylinder locomotives, having cranks located 120 degrees apart, it has been found that, at certain positions of the cranks, the component of the piston thrusts is in an upward direction, tending to lift the main driving boxes from their journals, a condition which must be met by means limiting the rise of the boxes, such as supplemental bearings, located below the axial lines of the journals, and having a slight clearance away from the surfaces of the journals, the amount of such clearance forming the limit of the possible rise of the boxes. Prolonged service effects wear of the crown bearings, inasmuch as the superposed load on the journals is on their vertical central line, and in order to prevent the boxes from rising from their journals, after the crown bearings have become worn, it is necessary that the means employed to prevent the rising of the boxes, shall be adjustable throughout the allowable degree of crown bearing wear.

The application of supplemental bearings in locomotives other than those having three cylinders, has been found, in practice, to retard the wear of the crown bearings, and my invention is designed to provide for simple and convenient construction, installation, and adjustment of such supplemental bearings for all classes of locomotive driving boxes.

In the accompanying drawings: Figure 1 is a front view, in elevation, of a driving box, illustrating an embodiment of my invention; Fig. 2, a vertical longitudinal central section through the same; Fig. 3, a view, in perspective, of a supplemental bearing of the driving box of Figs. 1 and 2; Fig. 4, a similar view of an adjusting wedge for the supplemental bearing; and, Fig. 5, a similar view of an adjusting wedge operating in connection therewith.

In the practice of my invention, referring descriptively to the specific embodiment thereof which is herein exemplified the driving box, 1, is provided with a crown brass, $1^a$, and with supplemental bearings, 2, fitted in it, below the crown brass. The supplemental bearings are notched at their tops, to fit over pins, $2^d$, located in the driving box, midway of its length, for the purpose of properly positioning them lengthwise of the box, and they, together with adjusting wedges, 8, $8^a$, are each fitted in one of a pair of dove-tailed grooves, $1^g$, planed in the driving box, on opposite sides thereof. The portions of the bottoms of the supplemental bearings which adjoin the journal are flat, and the remainder of the bottoms is formed with two oppositely inclined faces, $2^e$, $2^f$, which abut against similarly inclined faces, $8^b$, $8^c$, on the adjusting wedges, 8 and $8^a$, respectively. The bottoms of said wedges are inclined in correspondence with the inclination of the bottoms of the dovetailed grooves, $1^g$, of the driving box, and their tops are partly flat and partly inclined in correspondence with the inclined bottom faces of the supplemental bearings. A bolt, $8^d$, is formed on, or fixed to, each of the adjusting wedges, 8, said bolts passing freely through the wedges, $8^a$, and being threaded at their outer extremities, for the engagement of nuts, $8^e$, bearing against the outer ends of the wedges, $8^a$.

In order to elevate the supplemental bearings for the purpose of taking up wear, the nuts, 8°, are tightened, thereby drawing the adjusting wedges together and raising the supplemental bearings by their action therein, until the supplemental bearings are brought into contact with the journal. Additional elevation of the supplemental bearings, to take up wear of the crown brass, may be effected by removing the required amount of metal from their top faces. It will be observed that with this structural disposition, the contained parts may be removed, replaced, and adjusted, while the box is in position on the locomotive.

I claim as my invention and desire to secure by Letters Patent:

1. The combination of a locomotive driving box; a crown brass therein; supplemental bearings, fitting in dovetailed recesses in the inner faces of the side walls of the driving box, and having oppositely inclined bottom faces; and wedging mechanism, fitted in said recesses, below the supplemental bearings, and adjustable longitudinally to exert bearing thereon.

2. The combination of a locomotive driving box, having dovetailed recesses in the inner faces of its side walls; a crown brass fixed in the driving box; supplemental bearings, fitting in the recesses of the driving box, and having oppositely inclined bottom faces; wedges, fitting in said recesses, and abutting, in pairs, on the inclined faces of the supplemental bearings; adjusting bolts, each connected to one wedge of a pair, and passing freely through the other; and nuts, engaging said bolts and drawing the wedges to bear on the supplemental bearings.

3. The combination of a locomotive driving box, having dovetailed recesses in the inner faces of its side walls; a crown brass, fixed in the driving box; supplemental bearings, fitting in the recesses of the driving box, and having oppositely inclined bottom faces; wedges, fitting in said recesses, and abutting, in pairs, on the inclined faces of the supplemental bearings; adjusting bolts, each connected to one wedge of a pair and passing freely through the other; nuts, engaging said bolts and drawing the wedges to bear on the supplemental bearings; and a lubricant cellar, fitting freely between the pairs of wedges and removable without disturbance thereof or of the supplemental bearings.

JAMES G. BLUNT.